US007072835B2

(12) United States Patent
Konuma et al.

(10) Patent No.: US 7,072,835 B2
(45) Date of Patent: Jul. 4, 2006

(54) METHOD AND APPARATUS FOR SPEECH RECOGNITION

(75) Inventors: Tomohiro Konuma, Kanagawa (JP); Tsuyoshi Inoue, Kanagawa (JP); Mitsuru Endo, Kanagawa (JP); Natsuki Saito, Chiba (JP); Akira Ishida, Kanagawa (JP); Tatsuya Kimura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 737 days.

(21) Appl. No.: 10/052,145

(22) Filed: Jan. 17, 2002

(65) Prior Publication Data

US 2002/0128836 A1 Sep. 12, 2002

(30) Foreign Application Priority Data

Jan. 23, 2001 (JP) .............................. 2001-014160

(51) Int. Cl.
*G10L 15/04* (2006.01)
(52) U.S. Cl. ...................... 704/251; 704/704; 704/248; 704/254
(58) Field of Classification Search ................ 704/251, 704/248, 242, 254, 256
See application file for complete search history.

(56) References Cited

U.S. PATENT DOCUMENTS

| 5,241,619 A | 8/1993 | Schwartz et al. | |
| 5,706,397 A * | 1/1998 | Chow | 704/243 |
| 6,374,220 B1 * | 4/2002 | Kao | 704/255 |

FOREIGN PATENT DOCUMENTS

| EP | 0 936 598 | 8/1999 |
| JP | 08006588 | 1/1996 |
| JP | 09081185 | 3/1997 |
| JP | 10254496 | 9/1998 |
| JP | 11045097 | 2/1999 |

OTHER PUBLICATIONS

Alleva, F. "Search Organization in Whisper Continuous Speech Recognition System," 1997, Proceeding 1997, IEEE Workshop on Automatic Speech Recognition and Understanding, pp. 295-302.*
The HTK Book (for HTK Version 2.2), Jan. 1999, section 13.1.*
Data Driven Search Organization for Continuous Speech Recognition, Ney et al, IEEE Trans. on Signal Processing, vol. 40, No. 2, Feb. 1992.
Michael T. Johnson et al., "Interfacing Acoustic Models with Natural Language Processing Systems", ICSLP 1998, Oct. 1998, XP007000635.
European Search Report corresponding to application No. EP 02 00 0206 dated Dec. 13, 2003.

* cited by examiner

Primary Examiner—V. Paul Harper
(74) Attorney, Agent, or Firm—RatnerPrestia

(57) ABSTRACT

A method and apparatus for speech recognition of the present application has a process to collate, with an input utterance, an acoustic model corresponding to a hypothesis to be expressed by the connection of utterance segments, such as phonemes or syllables, and developed according to a length of an input utterance by an inter-word connection rule thereby obtaining a recognition score. Within a word of the hypothesis, the similar hypotheses high in utterance score within a predetermined threshold from the maximum value of the score are all held to a word end irrespectively of the number of hypotheses. Meanwhile, at a word end of the hypotheses, the hypotheses are narrowed to a predetermined number of upper ranking in the order of higher score.

4 Claims, 8 Drawing Sheets

| RECOGNITION WORD | INTER-WORD CONNECTION RULE ||||| 
| | CANDIDATE WORD 1 | CANDIDATE WORD 2 | CANDIDATE WORD 3 | ... | CANDIDATE WORD n |
| --- | --- | --- | --- | --- | --- |
| access | of | to | ... | ... | ... |
| accept | a | the | your | ... | ... |
| are | a | the | friends | ... | ... |
| ... | ... | ... | ... | ... | ... |
| cut | a | the | papers | ... | ... |
| ... | ... | ... | ... | ... | ... |
| ... | ... | ... | ... | ... | ... |

FIG. 7

METHOD AND APPARATUS FOR SPEECH RECOGNITION

FIELD OF THE INVENTION

The present invention relates to an art of speech recognition to be mounted on the general industrial and home-use electric appliances and, more particularly, to a method and apparatus for speech recognition improved in speech recognition rate.

BACKGROUND OF THE INVENTION

Conventionally, there has been a method and apparatus for speech recognition of, e.g. "Hermann Ney: Data Driven Search Organization for Continuous Speech Recognition (IEEE TRANSACTIONS ON SIGNAL PROCESSING Vol. 40 No. 2 p272 1992)".

FIG. 8 is a process flow of a speech recognition system as a related art. The process steps shown in the figure are executed synchronously with the frame of an input utterance. By executing to the end of the input utterance, a hypothesis approximate to the input utterance is obtained as a result of recognition. The search employing such a method is referred to as a frame synchronization beam search. Explanation is made below on each of the steps.

Using the one-pass search algorithm, a hypothesis is established on the i-th frame of an input utterance and developed in the (i+1)-th frame. If the hypothesis is within a word, an utterance segment is used to express the word. Otherwise, if the hypothesis is at a word end, a word to follow is joined according to an inter-word connection rule. This extends the first utterance segment. The hypothesis on the i-th frame is erased to store only the (i+1)-th hypothesis (step S801).

Next, among the hypotheses developed in the (i+1)-th frame by step S801, the hypothesis highest in the score accumulated up to the (i+1)-th frame (hereinafter, referred to as cumulative score) is taken as a reference. Stored are only the hypotheses having a score within a constant threshold with respect to the score while the other hypotheses than that are erased. This is referred to as narrowing the candidates. The narrowing avoids the number of hypotheses from increasing in an exponential fashion and hence becoming impossible to compute. (step S802)

Next, the process moves to the next frames that is "+1"-ed to the current frame i. Determination is made as to whether it is the last frame. If it is the last frame, the process is ended. If it is not the last frame, the process moves again to step 1. (step S803)

As in the foregoing, the related-art method narrows down the hypothetic candidates depending only upon whether the cumulative score is within a threshold or not.

Incidentally, there is, e.g. Japanese Patent Laid-Open No. 6588/1996 as a speech recognition method to accurately evaluate hypotheses in the frame synchronization beam search. The speech recognition method described in this publication shows the computation for normalization against time in the frame synchronization beam search. Namely, the score on a hypothesis at time t is subtracted by the common likelihood function to all the hypotheses. Then, stored is a maximum value of the normalized score and hypothesis having a score normalized within a constant threshold with respect to the maximum value.

In the related-art speech recognition system, however, the hypothesis within a word or at a word end takes as a reference a hypothesis highest in cumulative score as noted above, to store a hypothesis having a score within a constant threshold with respect to the score. Consequently, at the word end there are a number of connectable word candidates to follow, thus incurring great increase in the number of hypotheses. As a result, there has been a setback to difficult computation in selecting hypothetic candidates.

The present invention has been made to solve the problem. It is an object to provide a method and apparatus for speech recognition capable of effectively reducing the computation amount in selecting hypothetic candidates while securing the accuracy of speech recognition.

SUMMARY OF THE INVENTION

A method for speech recognition according to the present invention for solving the problem includes, in a frame synchronization beam search, a process, within a candidate word, to leave to a word end the similar hypothesis high in acoustic score irrespectively of the number of hypotheses and, at an end of a candidate word, to narrow down the number of hypotheses. Namely, the method for speech recognition comprises: a feature-amount extracting step for extracting a feature amount based on a frame of an input utterance; a storing step for determining whether a current processing frame is at an end of or within a candidate word previously registered, and storing the candidate word on the basis of a first hypothesis-storage determining criterion when at a word end and on the basis of a second hypothesis-storage determining criterion when within a word; a developing step for developing a hypothesis by extending utterance segments expressing the word when a stored candidate word is within a word and by joining a word to follow according to an inter-word connection rule when at a word end; an operating step of computing a similarity of between the feature amount extracted from the input utterance and a frame-based feature amount of an acoustic model of the developed hypothesis, and calculating a new recognition score from the similarity and a recognition score of the hypothesis of up to an immediately preceding frame calculated from the similarity; and a step of repeating the storing step, the developing step and the operating step until the processing frame becomes a last frame of the input utterance, and outputting, as a recognition result approximate to the input utterance, at least one of hypotheses in the order of higher recognition score due to processing the last frame.

BRIEF DESCRIPTION OF THE DRAWINGS

FIG. 7 shows an example of a inter-word connection rule in the embodiment of the invention;

DESCRIPTION OF THE PREFERRED EMBODIMENTS

The embodiments of the present invention will now be explained with reference to the drawings.

Figure 1:
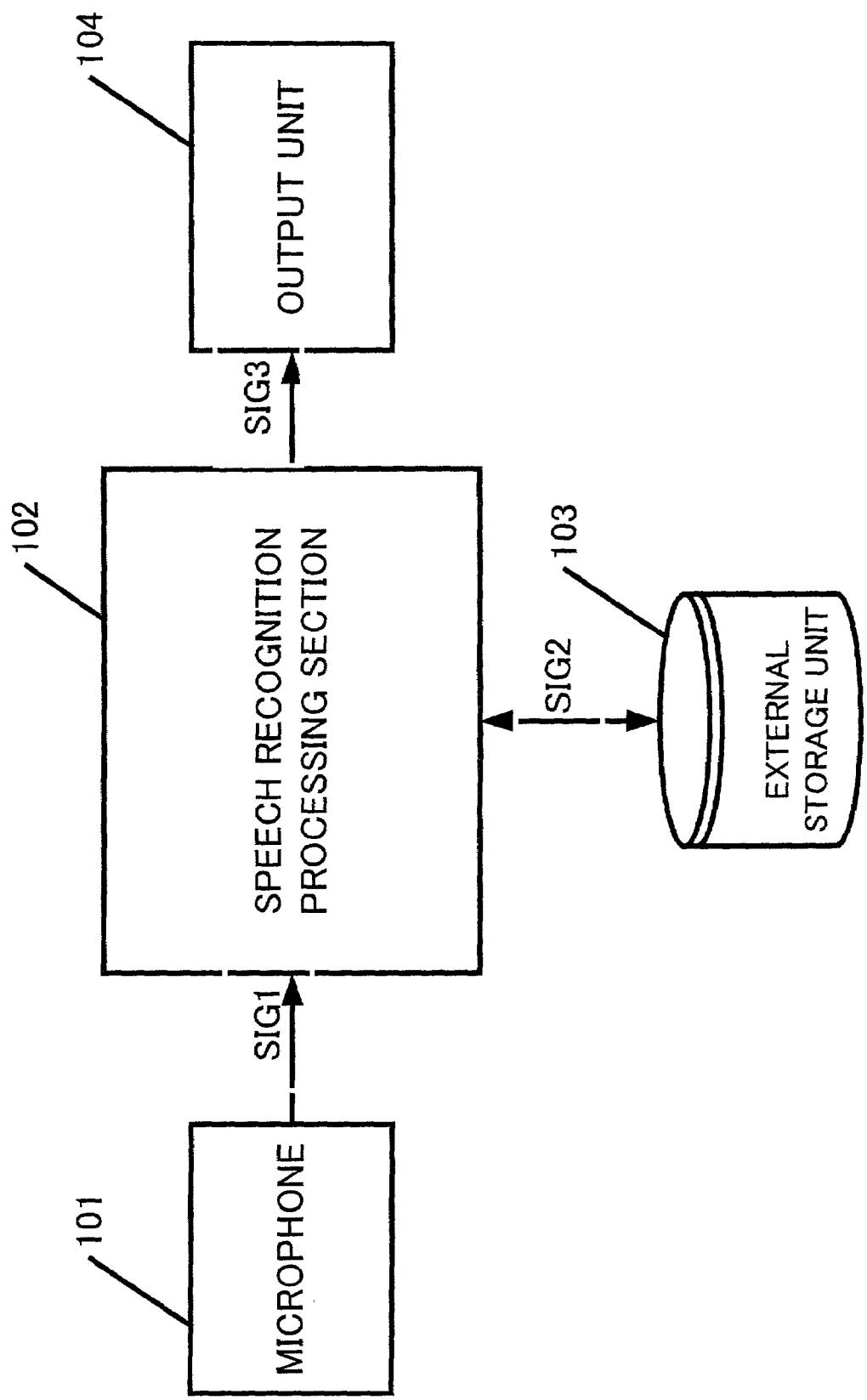
FIG. 1 shows a system configuration diagram showing a speech recognition apparatus in an embodiment of the present invention.

FIG. 1 shows an example of a configuration diagram of a speech recognition apparatus in an embodiment of the invention.

In FIG. 1, the speech recognition apparatus includes a microphone 101, a speech-recognition processing section 102, an external storage unit 103 and an output unit 104.

The microphone 101 is to capture an utterance spoken by a user, and integral with the speech recognition apparatus. Note that the microphone 101 is not necessarily in one body with the speech recognition apparatus.

The speech-recognition processing section 102, when detecting an input of utterance through the microphone 101, processes to recognize a word uttered by the user from among the candidate words as a subject of speech recognition.

The external storage unit 103 is stored with a processing program to be executed in the speech-recognition processing section 102.

The output unit 104 is a liquid crystal panel to display the word or text recognized by the speech-recognition processing section 102.

Explanation is now made on the operation outline of the present embodiment.

The speech recognition apparatus, at turning on power, loads a processing program as a data signal SIG2 from the external storage unit 103 to the speech-recognition processing section 102. The processing program is to be executed after stored to a main storage section of the speech-recognition processing section 102. Then, the speech-recognition processing section 102 receives an utterance signal SIG1 of user's utterance words for recognition through the microphone 101 and stores it to the main storage section of the speech-recognition processing section 102. The user's utterance words may be a word or a text consisting of a plurality of sentences. Next, the speech-recognition processing section 102 performs a recognition process on the input utterance in the order of from the top thereof according to the processing program, to display a closest-matched word or text from among the candidate words on the output unit 104 controlled by a signal SIG3.

Figure 2:
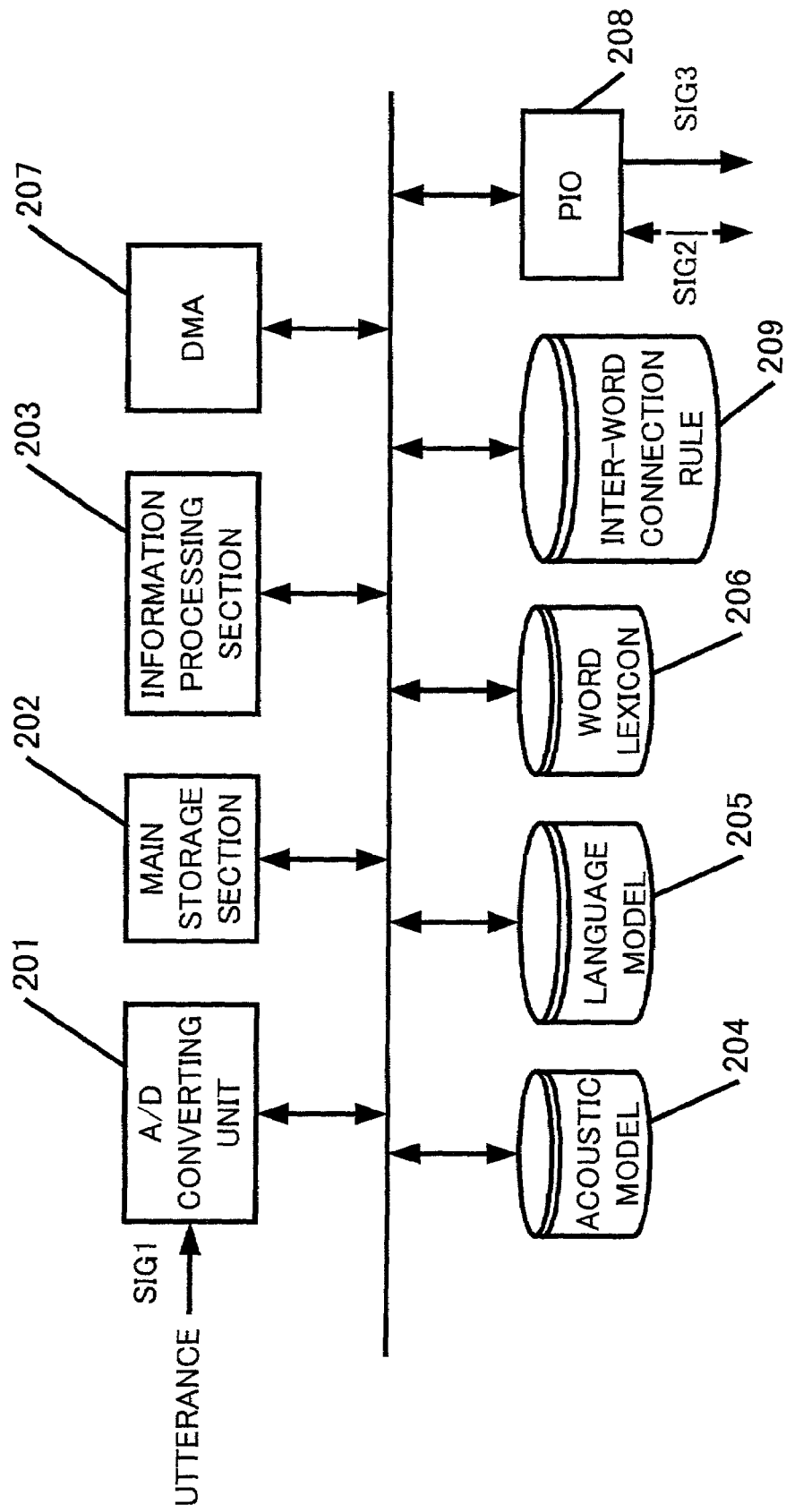
FIG. 2 shows a block diagram of a hardware configuration of a speech recognition processing section in the embodiment of the invention.

Explanation is now made on an example of a hardware configuration of the speech-recognition processing section 102 with reference to FIG. 2.

The speech-recognition processing section 102 includes an A/D converter 201 to convert the analog signal inputted from the microphone 101 into a digital signal, a main storage section 202 to store data and processing programs, an information processing section 203 to process data according to the program, an acoustic model 204 configured with a plurality of frames modeled with the acoustic features based on utterance segments such as phonemes and syllables to express the word as a subject of recognition, a language model 205 describing a connection rule of between the words for recognition, a word lexicon 206 registered with candidate-word sets, an inter-word connection rule 209 recording the list of words to follow a certain word, a DMA (Direct Memory Access) 207 for transferring the process program at high rate from the external storage unit 103 to the main storage section 202, and a PIO (Parallel I/O) 208 for bidirectional parallel communication between the external storage unit 103 and the output unit 104 and delivering data synchronously onto a bus. Note that, in the figure, the devices 201 to 209 are connected through the bus. Next, explanation is made on the functional block configuration of the speech-recognition processing section 102 to be realized by the hardware configuration noted above with reference to FIG. 3.

The storage section 301 temporarily stores input utterance data, feature amount vectors, candidate words and so on. The feature amount extracting section 302 extracts a feature amount of utterance from the input utterance. An intra-word word end determining section 303 determines whether a hypothesis is within a word or at a word end. An intra-word hypothesis storage determining section 304 determines whether to store a hypothetic candidate word or not, by an utterance-based recognition score. A word-end hypothesis storage determining section 305 determines whether to store a hypothesis or not, by the number of hypothetic candidate words. A search control section 306 extends the utterance segments expressing a word if the hypothesis is within a word, and joins a word to follow in compliance with the inter-word connection rule described in the language model 205 when at a word end. Thus, the control section 306 carries out development control of the hypothesis in a frame synchronization beam search to develop the hypothesis. A similarity computing section 307 computes a similarity of between a frame-based feature amount of the input utterance outputted from the feature amount extracting section 302 and the acoustic model 204. A search operating section 308 computes a recognition score from the similarity computed by the similarity computing section 307 and the recognition score of the hypothesis of up to the immediately preceding frame. The hypothesis updating section 309 updates the hypothesis and computed recognition score. A speech-recognition end determining section 310 determines whether or not the process has been completed up to the end of the input utterance data stored in the storage section 301. A recognition result outputting section 311 continues the frame synchronization beam search to the end of input utterance and outputs, as a recognition result, an outputtable hypothesis high in recognition score.

Figure 4:
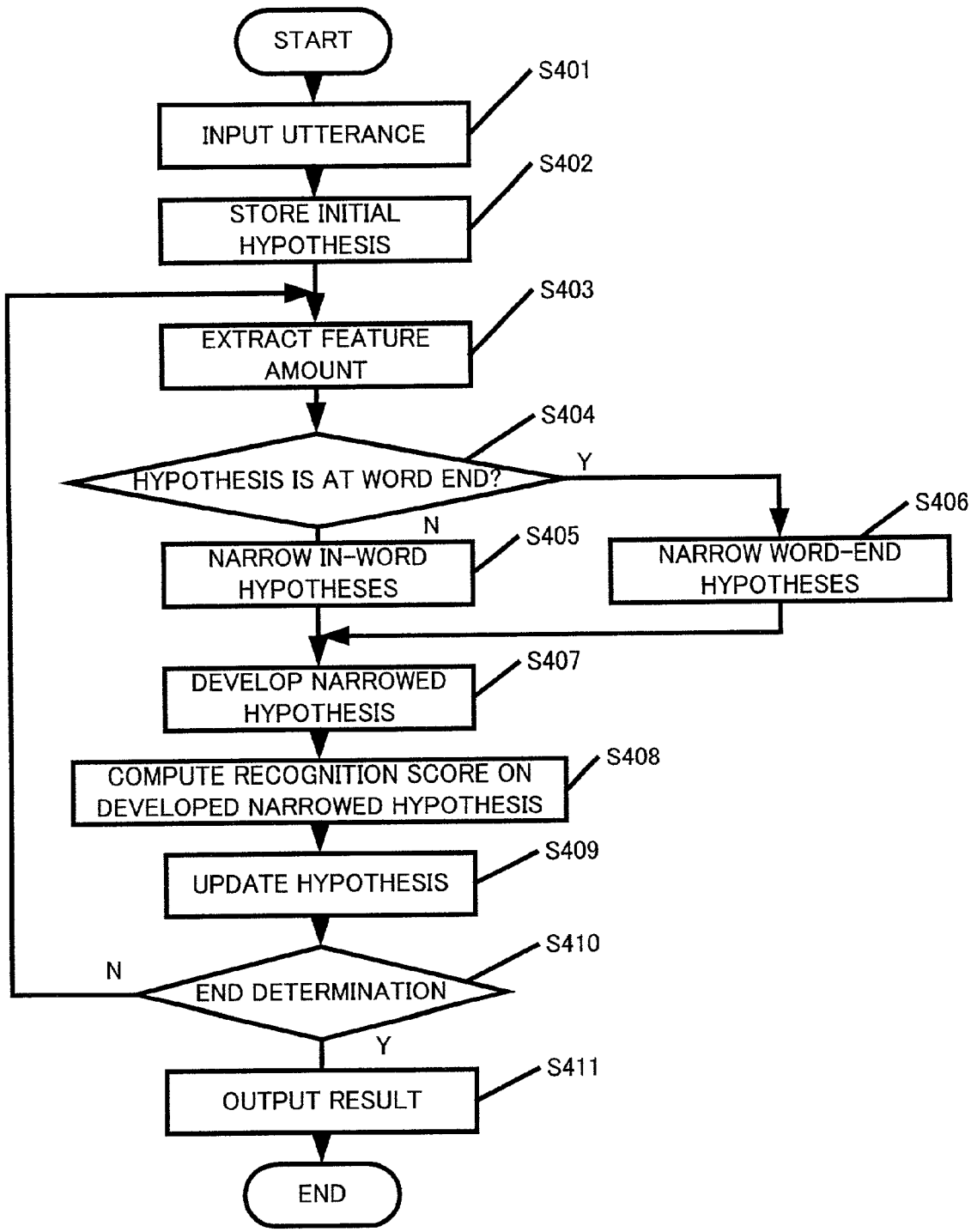
FIG. 4 is a flowchart showing a process procedure of the speech recognition processing section in the embodiment of the invention.

FIG. 4 is a flowchart showing a data process flow by the functional blocks in the speech-recognition processing section 102. Using the flowchart, the data process flow is explained.

Figure 3:
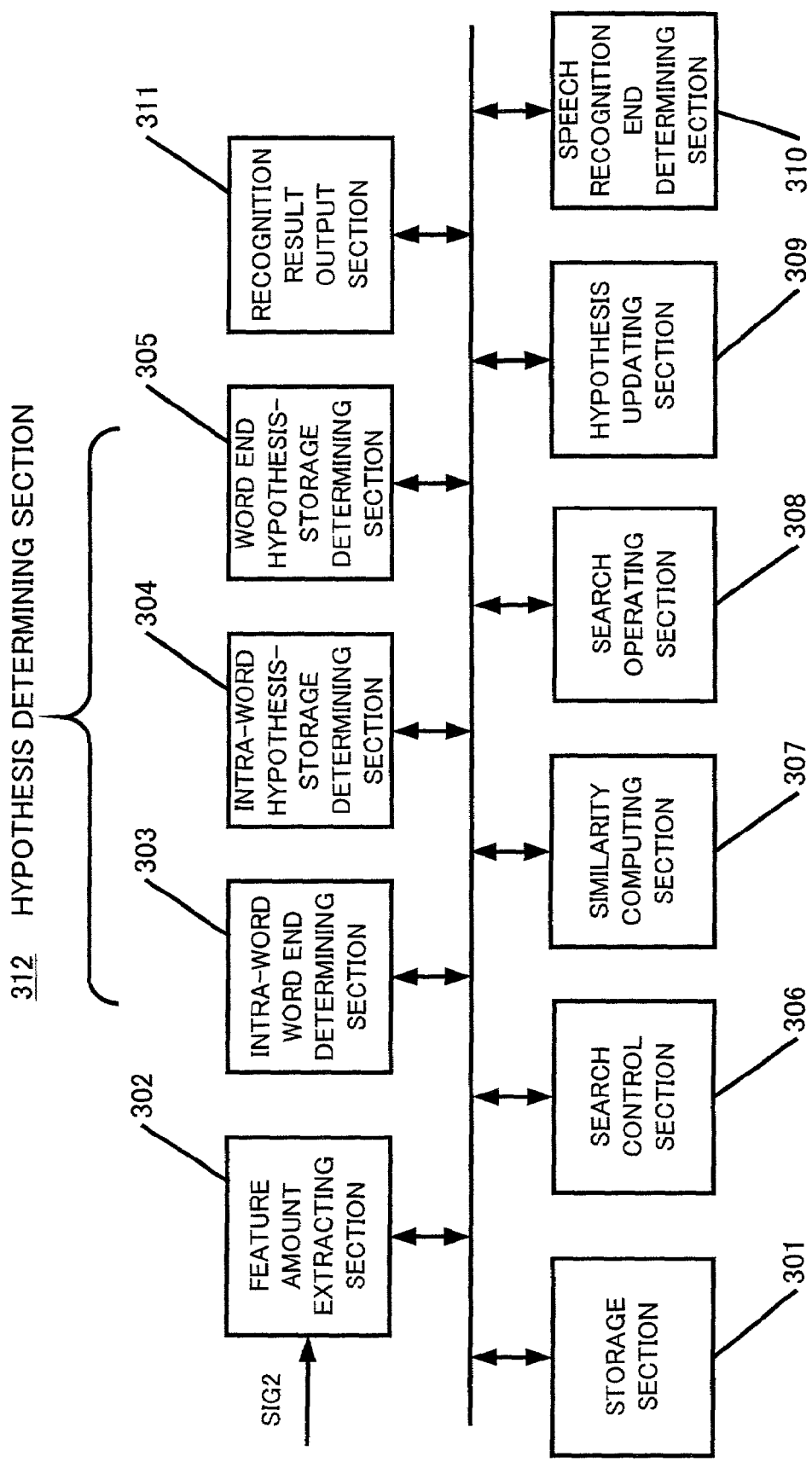
FIG. 3 shows a block diagram of a functional configuration of the speech recognition processing section in the embodiment of the invention.

In the figure, S represents each process step wherein each process step is to be realized by the functional block of FIG. 3.

At first, the entire utterance signal spoken by the user is temporarily stored based on a frame of 10 ms to the storage section 301 (step S401).

Figure 5:
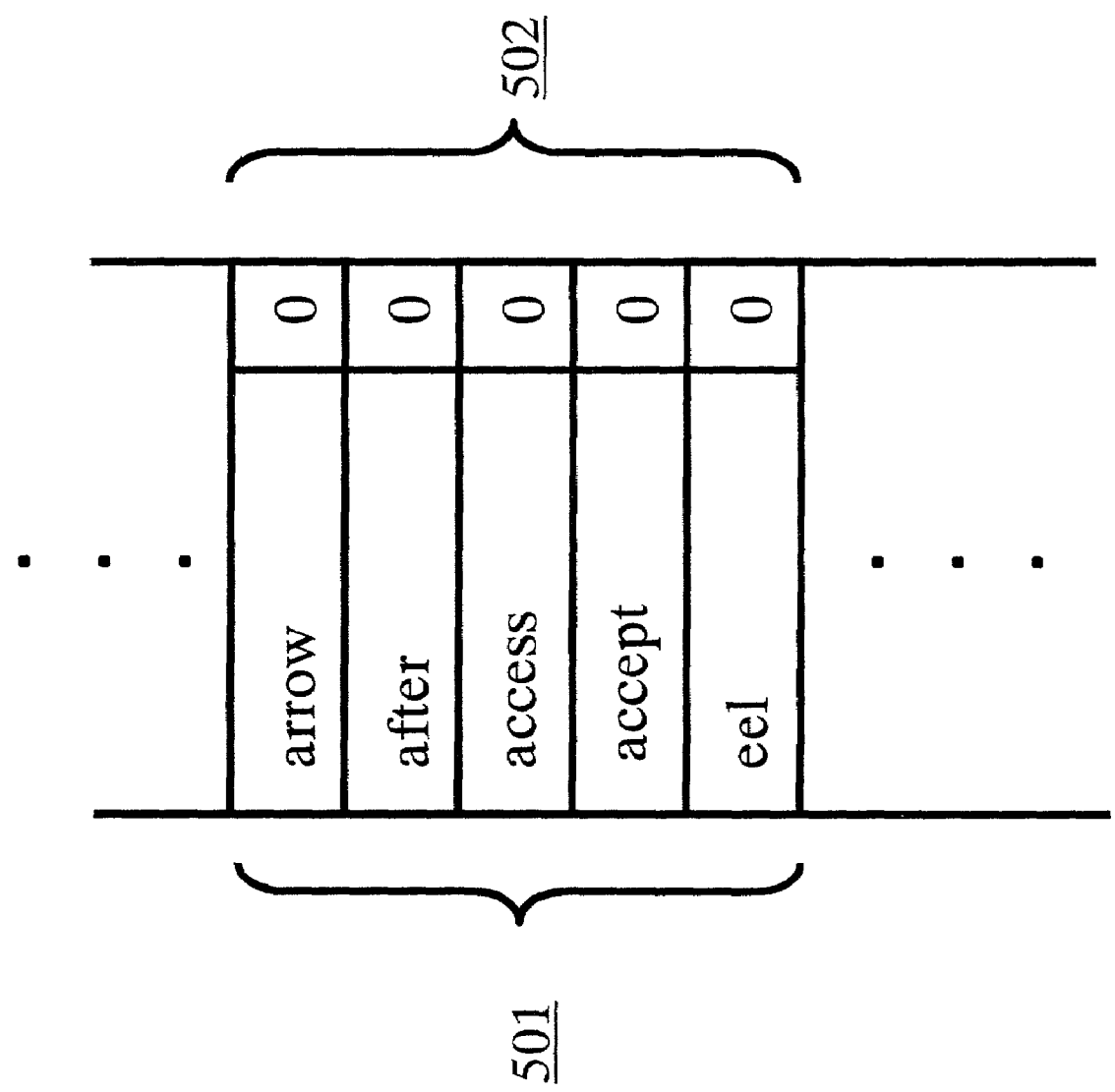
FIG. 5 shows an explanatory figure on a set of candidate words to be first registered and recognition scores thereof in the embodiment of the invention.

Next, the utterance input is detected, to copy from the word lexicon 104 an initial set of a hypothesis including candidate words previously registered and recognition scores having an initial value of '0' and store it to the storage section 301 (step S402). The present embodiment stored an initial set of a hypothesis including the candidate words and recognition scores as shown in FIG. 5. FIG. 5 is an example storing five words 501, i.e. "arrow", "after", "access", "accept" and "eel" and the respective recognition scores 502 (initial value '0'). For the candidate words, it is possible to register coined words having no linguistic meaning.

Then, the feature amount extracting section 302 conducts LPC cepstrum analysis, only in the first time after utterance, on all the accumulated frames and extracts LPC cepstral coefficient vectors, storing them again to the storage section 301. From then on, LPC cepstrum vectors are read out of the storage section 301 according to sequential recognition. (step S403) Although the feature amount to be extracted used LPC cepstral coefficient vectors, similar effect is available with other acoustic parameters such as MFCC (mel frequency cepstral coefficients).

Next, the intra-word word end determining section 303 determines whether being currently processed is the utterance segment within a word or the utterance segment at a word end (step S404). At the top of a user's utterance, assumption is on the utterance segment within a word. At other than the top of utterance, when the current processing frame on hypothesis is within a word instead of at a word end, the intra-word hypothesis storage determining section 304 narrows, with reference to a hypothesis within a word highest in recognition score of among the current candidate words, down to the intra-word hypotheses having recognition scores within a constant threshold with respect to that recognition score (step S405). Where the hypothesis is at a word end, the word-end hypothesis storage determining section 305 selects hypotheses in the order of higher recognition score from the current candidate words, to narrow the hypotheses according to the number of hypotheses (step S406).

Then, the search control section 306 extends the utterance segments to express a word if the narrowed hypothesis is within a word, and join a word to follow according to the inter-word connection rule 209 if at a word end, thus carrying out development as a new hypothetic candidate word (step S407).

Then, the similarity computing section 307 computes a similarity on the developed hypothesis from a feature amount of the currently processing frame of input utterance and a feature amount of the phonemes as utterance segments of a selected candidate word 501. The search operating section 308 adds together the similarity and the hypothesis recognition score of up to the immediately preceding frame, thereby determining a recognition score (step S408). These processes are called a frame synchronization beam search operation. Note that the feature amount of candidate word is extracted from the acoustic model 204 as a set of acoustic parameters based on the phoneme. In the embodiment, the similarity used a statistical distance measure expressed in Equation (1). From the similarity L (i, j), an acoustic score was determined by Equation (2).

In Equation (1), the acoustic score as (i, j) is at an input-utterance frame i and acoustic-model lexicon frame j.

$$L(i,j) = (x(i) - \mu(j))^t \Sigma(j)^{-1} (x(i) - \mu(j)) + \log|\Sigma(j)| \quad (1)$$

$$as(i,j) = |L(i,j)| \quad (2)$$

where "t" is a transpose, "−1" is an inverse matrix, x(i) is an input vector corresponding to an input frame i, and Σ(j) and μ(j) are a covariance matrix and mean-value vector of a feature vector corresponding to the lexicon frame j. The foregoing acoustic model, concretely, is a set of covariance matrixes and mean-value vectors on these lexicon frames. The input vector, in the embodiment, is an LPC cepstrum coefficient vector that is a feature vector the input utterance is extracted. The lexicon frame is also a feature vector that extracted from the acoustic model is a word registered in a word lexicon considered corresponding to the input frame.

Next, the hypothesis updating section 309 updates the developed hypothesis together with a new recognition score (step S409).

Figure 6:
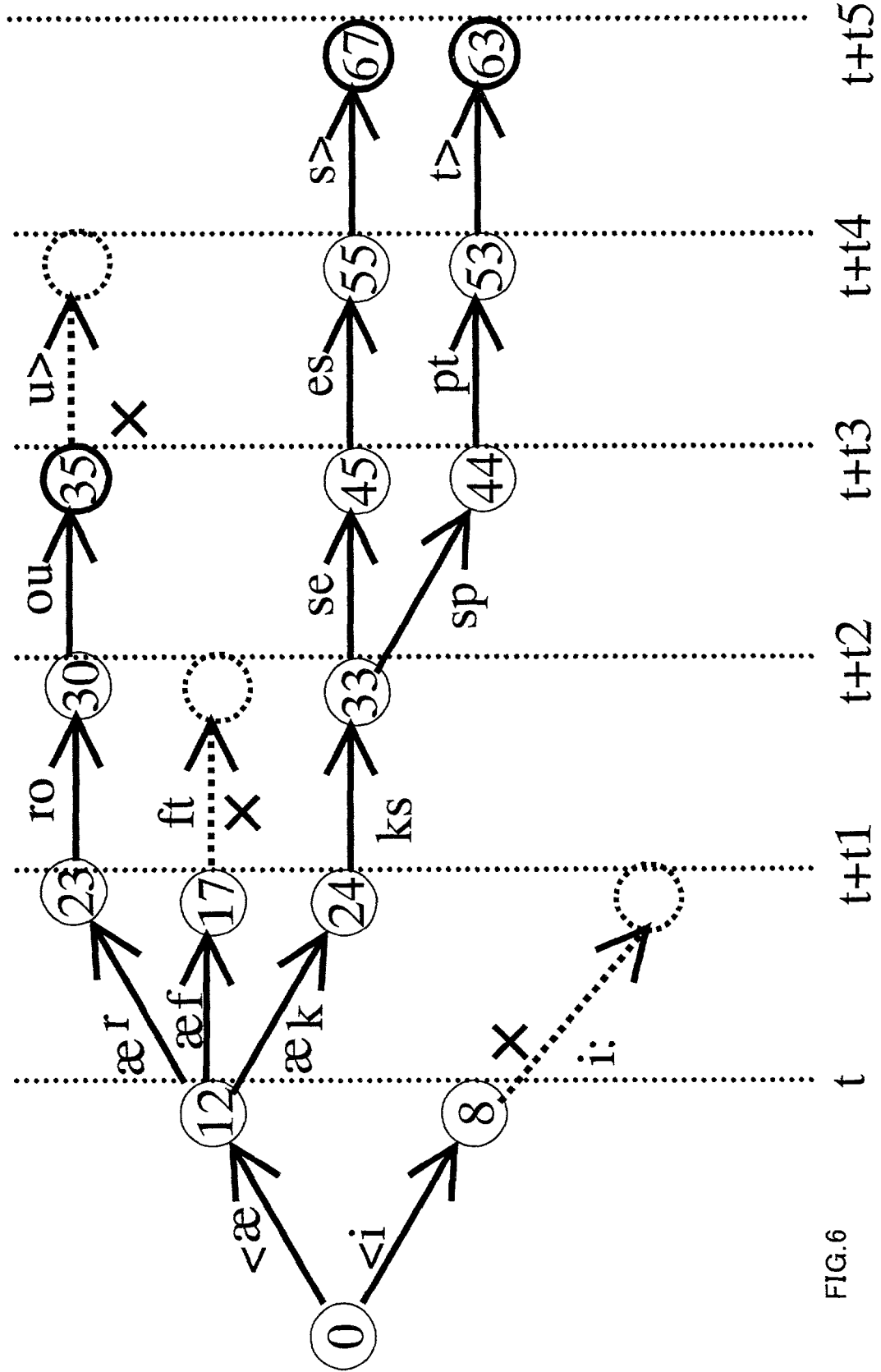
FIG. 6 shows a process progress diagram for hypothesis determination in the embodiment of the invention.
Figure 8:
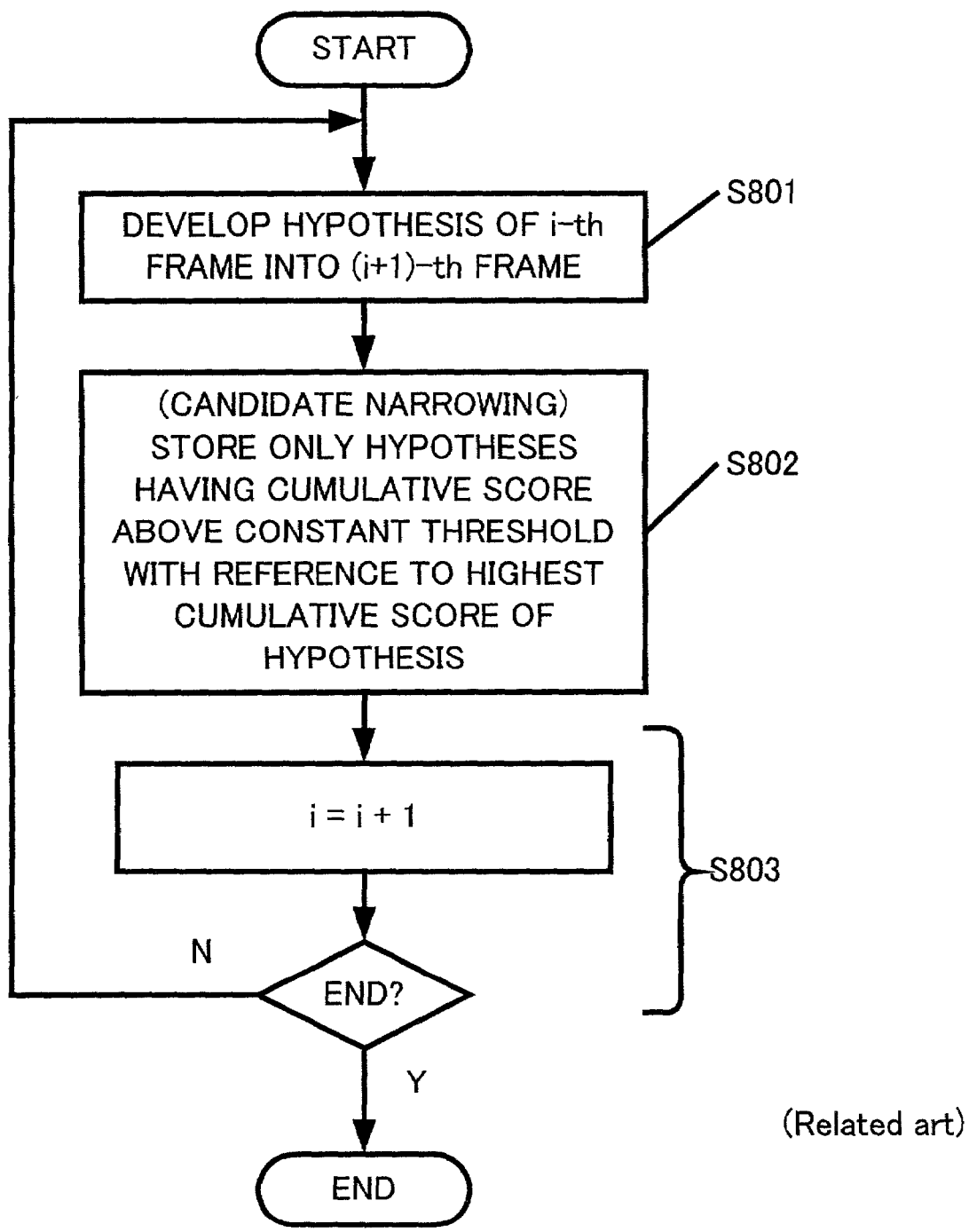
FIG. 8 is a flowchart showing a process procedure by a related art.

Explanation is made on the process of from process step S404 to S409, using FIG. 6.

In this embodiment, the constant threshold from the maximum recognition score as a determination criterion for an intra-word hypothesis is given '3' and the number of upper ranking recognition scores as a determination criterion for an word-end hypothesis is '2'. Note that the numeral in the circle represents a determined recognition score.

In FIG. 6, the five words stored by step S402 are processed based on the frame. At time t, the recognition score extended from a word top by 'æ' was a value "12" and that extended by 'i' was a value '8'. Because the recognition score of 'i' is equal to or less than a threshold (12−3=9), the candidate word "eel" is deleted from the candidates. Then, the four words other than "eel" are left to continue the process. At time t+t1, the recognition score of the candidate word "after" is equal to or less than a threshold (24−3=21) and hence deleted. There are left "arrow", "access" and "accept", and the process is continued. At time t+t3, the recognition score "35" of "arrow" is equal to or less than a threshold (45−3=42) and hence deleted. Left are "access" and "accept", to continue the process. At time t+t5, the remaining two words come to end. However, because the remainders are to the upper second ranking, "access and "accept" are both left.

Next, from the inter-word connection rule 209, candidate words to follow these candidate words are taken to provide new hypothetic candidates. This example is explained using FIG. 7.

FIG. 7 is an example of the inter-word connection rule. There are registrations of "of" and "to" each as a word to follow the word "access" left as a candidate in the embodiment, and registrations of "a", "the" and "your" as a word to follow the word"accept". These five words are extracted as new candidate words and the hypothesis is updated. Then, the process returns again to step S403.

Note that FIG. 6 in the embodiment describes only on the phoneme-based candidate narrowing process. In the actual process, however, similar candidate narrowing process is conducted based on the frame that a phoneme is configured with a plurality of frames.

In FIG. 4, the speech-recognition end determining section 310 determines whether or not the above process has completed to the last of the input utterance stored in the storage section 301. Until the end-determining condition is satisfied, the frame-based process of the steps S403 to S409 is repeated (S410).

Next, the recognition result output section 311 outputs to the output unit 104 a high recognition score of outputtable hypothesis as a recognition result from the set of hypotheses being left upon satisfying the end determining condition (S411).

In the speech recognition according to the present embodiment, the speech recognition process on one word requires a computation amount in average of 1,120,000 word lattice points. It can be considered that the computation amount is reduced to nearly a quarter, in view of 3,830,000 averaged word lattice points in the related-art method. Herein, the word lattice point refers to a candidate not trimmed out (survived) within the frame when the narrowing process is done through an utterance from its beginning to end in a frame synchronization beam search. Incidentally, the mean number of lattice points per word was determined by Equation (3).

$$a = \sum_{s=1}^{n}\sum_{f=s}^{e} Nf/U \quad (3)$$

where a: the mean number of total lattices per word, s: frame number at the beginning of utterance, e: frame number at the end of utterance, Nf: the number of lattice points in frame number.

Namely, the division of the summing up, over the total number of utterances, the total number of lattice points of from the utterance beginning-s to the utterance end-e by the number of total utterances.

Meanwhile, concerning the accuracy of speech recognition, the following result was obtained.

Using the five words used in the embodiment, experimental speech recognition was conducted on totally 30 persons including 15 men and women in each. According to the result, the related-art method had a recognition rate of 81.4% while the method of the invention 81.1%. In this manner, the speech recognition by the method of the invention is substantially not different in accuracy from the related-art method.

According to the present invention, in a frame synchronization beam search, the accuracy of recognition can be secured by exactly computing, to a word end, the hypothesis similar in pronunciation and high in score within a word, irrespectively of the number of hypotheses. Furthermore, at a word end, reduced is the number of hypotheses due to the connection of the words to follow. Accordingly, by narrowing the number of hypotheses, computation amount can be effectively reduced while securing the accuracy of recognition. This increases the speed of speech recognition processing and improves the real-time capability.

What is claimed is:

1. A method for speech recognition comprising:
a feature-amount extracting step for extracting a feature amount based on a processing frame of an input utterance;
a storing step for determining whether a current processing frame is within or at the end of at least one candidate word within a hypothesis, the at least one candidate word developed from the hypothesis, and storing one or more candidate words on the basis of a first hypothesis-storage determining criterion when within the word and on the basis of a second hypothesis-storage determining criterion when at the word end;
a developing step for developing the hypothesis, each candidate word within the hypothesis selected from words previously registered, by extending utterance segments to at least one processing frame following the current processing frame to express the candidate word when the candidate word is within the word and by joining a new candidate word to follow according to an inter-word connection rule when at the word end;
an operating step of computing a similarity measure between the feature amount extracted from the input utterance and a frame-based feature amount of an acoustic model of the developed hypothesis for the current processing frame, and calculating a new recognition score from a) the similarity measure and b) a recognition score of the developed hypothesis of up to a frame immediately preceding the current processing frame calculated from the similarity measure; and a step of repeating the storing step, the developing step and the operating step until a last processing frame of the input utterance, and outputting the stored one or more candidate words for each processing frame as a recognition result approximate to the input utterance, in a decreasing order of recognition score, wherein the first hypothesis-storage determining criterion selects candidate words from the developed hypothesis within a predetermined threshold from a maximum value of the recognition score, wherein a number of candidate words stored according to the first hypothesis-storage determining criterion when within the word is independent of the second hypothesis-storage determining criterion, and the second hypothesis-storage determining criterion selects a subset of candidate words from among the candidate words selected according to the first hypothesis-storage determining criterion, the subset of candidate words selected according to a predetermined number of upper ranking recognition scores.

2. An apparatus for speech recognition comprising:
a feature-amount extracting section for extracting a feature amount based on a processing frame of an input utterance;
a search control section for controlling to develop a hypothesis, the hypothesis being at least one hypothetic candidate word, the hypothetic candidate word selected from candidate words previously registered, by extending utterance segments to at least one processing frame following a current processing frame to express the hypothetic candidate word when the hypothesis is within the word and by joining a new hypothetic candidate word to follow according to an inter-word connection rule previously determined when at the word end;
a similarity computing section for computing a similarity measure between the feature amount extracted from the input utterance and a frame feature amount of an acoustic model of the developed hypothesis for the current processing frame;
a search operating section for operating a recognition score from the similarity measure and recognition score of the developed hypothesis of up to a processing frame immediately preceding the current processing frame;
a hypothesis determining section for determining whether the current processing frame is within the word or at the word end of the at least one hypothetic candidate word of the developed hypothesis and using the recognition score to select from among the at least one hypothetic candidate word according to a first determining criterion when within the word and to select from among the at least one hypothetic candidate word according to a second determining criterion when at the word end to form a selected hypothesis;
a hypothesis storing device for storing the selected hypothesis;
a word hypothesis registering device for registering as a new hypothesis the stored hypothesis and the recognition score; and
a recognition result output section for continuing a frame-based processing of the input utterance to a last processing frame of the input utterance and outputting at least one stored hypothesis in a decreasing order of recognition score, wherein the first determining criterion selects from among the at least one hypothetic candidate words within a predetermined threshold from a maximum value of the recognition score, wherein a number of candidate words stored according to the first determining criterion when within the word is independent of the second determining criterion, and the second determining criterion selects a subset of hypothetic candidate words from among the at least one hypothetic candidate words selected according to the first determining criterion, the subset of candidate words selected according to a predetermined number of upper ranking recognition scores.

3. A computer program stored in a computer-readable medium for causing a computer to execute a method, said method comprising:

a feature-amount extracting step for extracting a feature amount based on a processing frame of an input utterance;

a storing step for determining whether a current processing frame is within or at the end of at least one candidate word within a hypothesis, the at least one candidate word developed from the hypothesis, an storing one or more candidate words on the basis of a first hypothesis-storage determining criterion when within the word and on the basis of a second hypothesis-storage determining criterion when at the word end;

a developing step for developing the hypothesis, each candidate word within the hypothesis selected from words previously registered, by extending utterance segments to at least one processing frame following the current processing frame to express the candidate word when the candidate word is within the word and by joining a new candidate word to follow according to an inter-word connection rule when at the word end;

an operating step of computing a similarity measure between the feature amount extracted from the input utterance and a frame-based feature amount of an acoustic model of the developed hypothesis for the current processing frame, and calculating a new recognition score from a) the similarity measure and b) a recognition score of the developed hypothesis of up to a processing frame immediately preceding the current processing frame calculated from the similarity measure; and a step of repeating the storing step, the developing step and the operating step until a last processing frame of the input utterance, and outputting the stored one or more candidate words for each processing frame as a recognition result approximate to the input utterance in a decreasing order of recognition score, wherein the first hypothesis-storage determining criterion selects candidate words from the developed hypothesis within a predetermined threshold from a maximum value of the recognition score, wherein a number of candidate words stored according to the first hypothesis-storage determining criterion when within the word is independent of the second hypothesis-storage determining criterion, and the second hypothesis-storage determining criterion selects a subset of candidate words from among the candidate words selected according to the first hypothesis-storage determining criterion, the subset of candidate words selected according to a predetermined number of upper ranking recognition scores.

4. A computer-readable recording medium recording a computer program to allow a computer to execute a method, said method comprising:

a feature-amount extracting step for extracting a feature amount based on a processing frame of an input utterance;

a storing step for determining whether a current processing frame is within or at the end of at least one candidate word within a hypothesis, the at least one candidate word developed from the hypothesis, and storing one or more candidate words on the basis of a first hypothesis-storage determining criterion when within the word and on the basis of a second hypothesis-storage determining criterion when at the word end;

a developing step for developing the hypothesis, each candidate word within the hypothesis selected from words previously registered, by extending utterance segments to at least one processing frame following the current processing frame to express the candidate word when the candidate word is within the word and by joining a new candidate word to follow according to an inter-word connection rule when at the word end;

an operating step of computing a similarity measure between the feature amount extracted from the input utterance and a frame-based feature amount of an acoustic model of the developed hypothesis for the current processing frame, and calculating a new recognition score from a) the similarity measure and b) a recognition score of the developed hypothesis of up to a processing frame immediately preceding the current processing frame calculated from the similarity measure; and a step of repeating the storing step, the developing step and the operating step until a last processing frame of the input utterance, and outputting the stored one or more candidate words for each processing frame as a recognition result approximate to the input utterance in a decreasing order of recognition score, wherein the first hypothesis-storage determining criterion selects candidate words from the developed hypothesis within a predetermined threshold from a maximum value of the recognition score, wherein a number of candidate words stored according to the first hypothesis-storage determining criterion when within the word is independent of the second hypothesis-storage determining criterion, and the second hypothesis-storage determining criterion selects a subset of candidate words from among the candidate words selected according to the first hypothesis-storage determining criterion, the subset of candidate words selected according to a predetermined number of upper ranking recognition scores.

* * * * *

UNITED STATES PATENT AND TRADEMARK OFFICE
CERTIFICATE OF CORRECTION

| | |
|---|---|
| PATENT NO. | : 7,072,835 B2 |
| APPLICATION NO. | : 10/052145 |
| DATED | : July 4, 2006 |
| INVENTOR(S) | : Tomohiro Konuma et al. |

It is certified that error appears in the above-identified patent and that said Letters Patent is hereby corrected as shown below:

<u>Column 9</u>
Line 23, "an" should read --and--.

Signed and Sealed this

Twenty-sixth Day of December, 2006

JON W. DUDAS
*Director of the United States Patent and Trademark Office*